(12) United States Patent
Yamaguchi

(10) Patent No.: US 6,517,252 B2
(45) Date of Patent: Feb. 11, 2003

(54) OPTICAL CONNECTOR

(75) Inventor: Tohru Yamaguchi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/899,268

(22) Filed: Jul. 6, 2001

(65) Prior Publication Data

US 2002/0012507 A1 Jan. 31, 2002

(30) Foreign Application Priority Data

Jul. 7, 2000 (JP) .................................... 2000-206622

(51) Int. Cl.[7] ................................................ G02B 6/36
(52) U.S. Cl. ........................................ 385/53; 439/567
(58) Field of Search ................................ 439/567, 570, 439/931; 385/53–60

(56) References Cited

U.S. PATENT DOCUMENTS 6,217,346 B1 * 4/2001 Cubon ........................ 439/79
6,331,122 B1 * 12/2001 Wu ............................. 439/567

FOREIGN PATENT DOCUMENTS

JP 9-61677 3/1997

* cited by examiner

*Primary Examiner*—Khiem Nguyen
(74) *Attorney, Agent, or Firm*—Armstrong, Westerman & Hattori, LLP

(57) ABSTRACT

An optical connector capable of reducing labor for mounting it onto a substrate member is provided. A receptacle 1 as an optical connector is fixed to a printed circuit board 70. The printed circuit board 70 has a slit 71. The receptacle 1 has a housing 21, optical receiving/transmitting devices 24*a*, 24*b* are accommodated in the housing 21, and earthing terminals 22. The housing 21 has a conductive base material and an insulation film formed over a surface of the base material. The housing has an earthing terminal press-fit portion 35. The terminal 22 is pressedly into the slit 70 of the earthing terminal press-fit portion 35. When the earthing terminal 22 is pressedly inserted into the earthing terminal press-fit portion 35, the earthing terminal 22 removes the insulation film from the surface of the slit 70 and is put into contact with the base material.

1 Claim, 9 Drawing Sheets

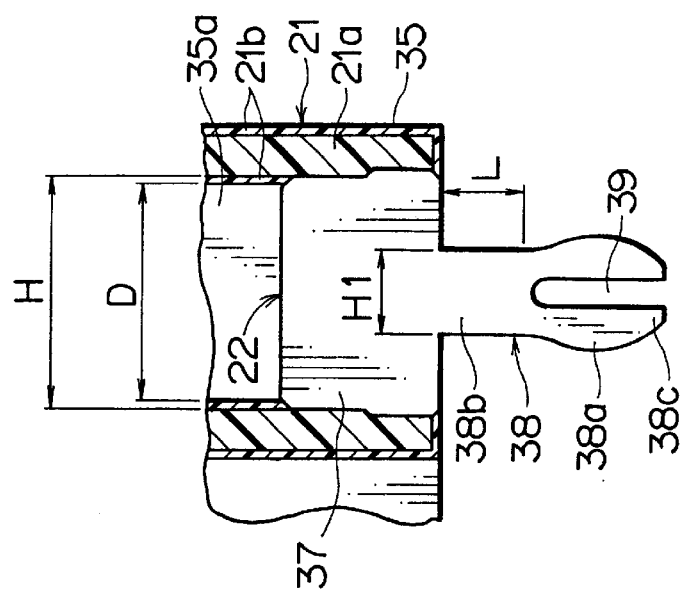
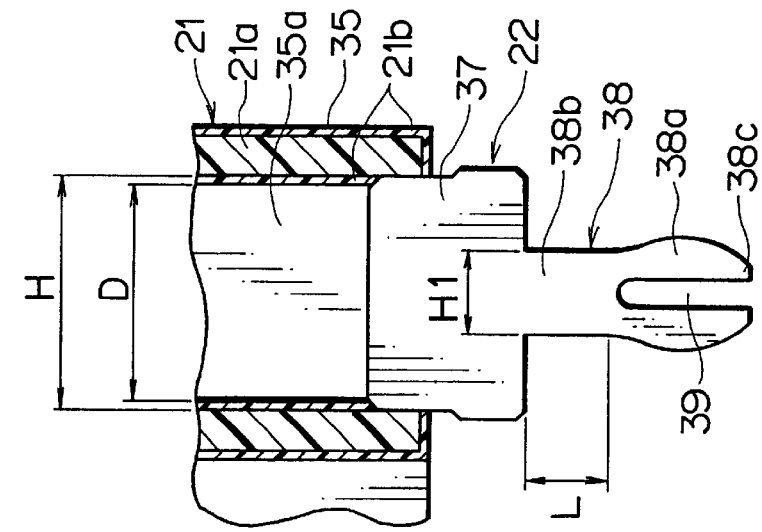
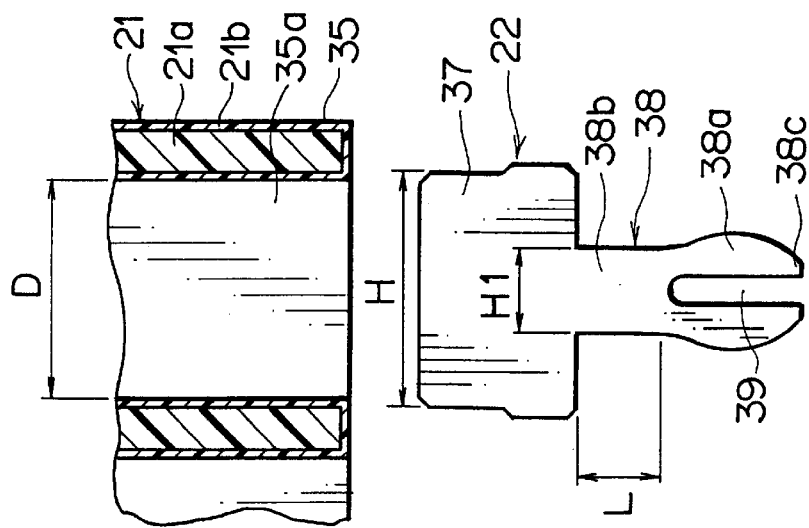

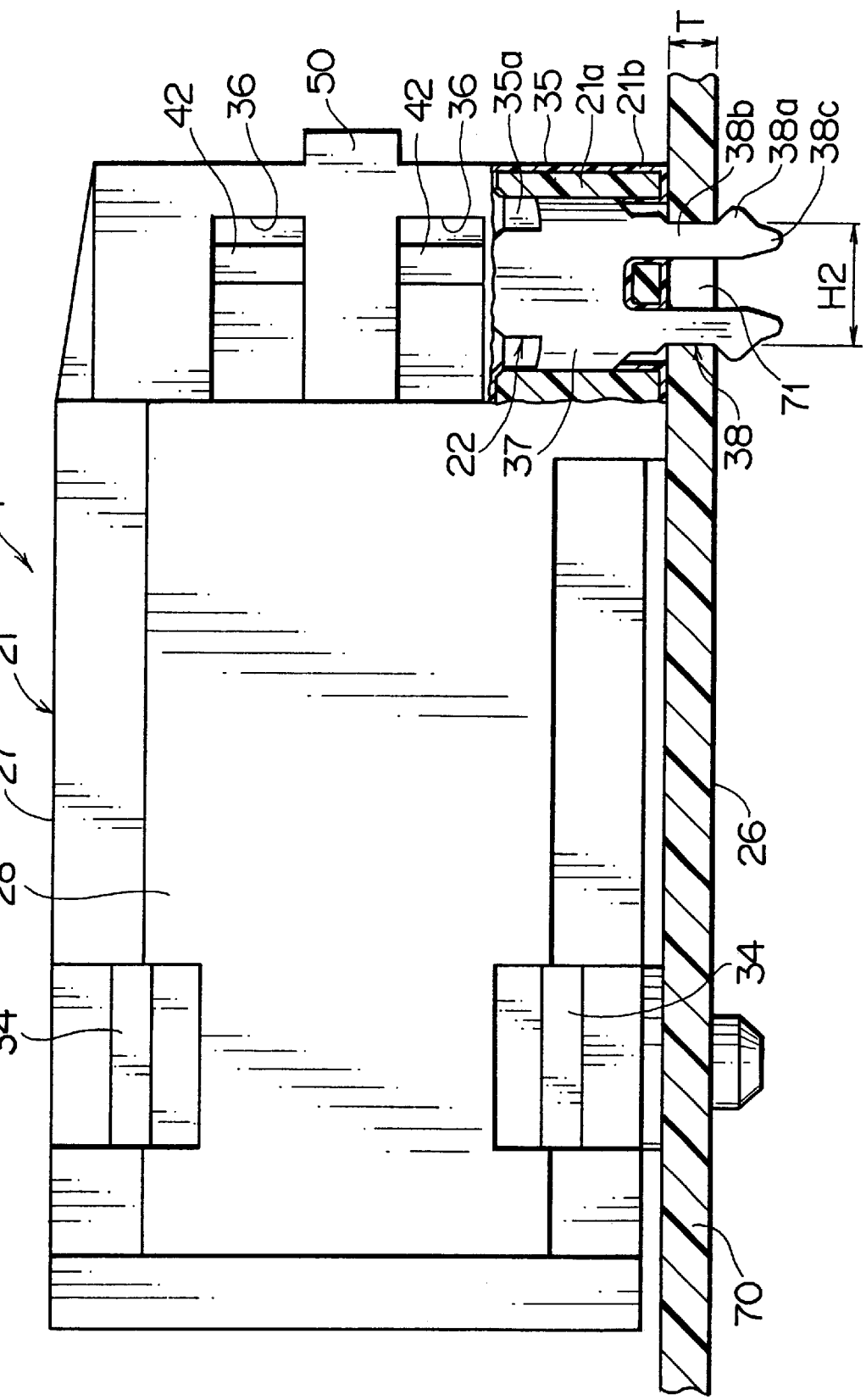

OPTICAL CONNECTOR

BACKGROUND OF THE INVENTION

1. Field of the invention

The present invention relates to an optical connector to optically connect an optical receiving module and an optical transmitting module to respective optical fibers.

2. Description of the Related Art

A wiring harness has been used for connecting equipment or accessories of an automobile. However, the wiring harness has been enlarged and has increased its weight according to the increase of equipment or accessories and their circuits. A fiber optic communications system which sends signals to the accessories by using the optical fiber cable used as a part of the wiring harness has been proposed in order to solve the above problem.

In the above fiber optic communications system, the signal light transmitted from the optical fiber cable is converted into electrical signal, and the electrical signal is converted into the signal light outputted to the optical fiber cable. For this purpose a receptacle 103 shown in FIG. 16 (an equipment side connector) has been proposed.

The receptacle 103 in FIG. 16 couples with a mating optical connector, i.e. a non-shown optical plug (an optical fiber side connector). And, the receptacle 103 is attached to a printed circuit board 120 or the like of an accessory. On the printed circuit board 120, a hole 122 for a bolt 121 is formed.

The receptacle 103 has a housing 107, an optical receiving module and an optical transmitting module 104, and a pair of sleeves 101. The housing 107 is formed in a box-shape. The housing 107 is made of a base material of insulative synthetic resin and a thin insulation film formed on the surface of the base material. The housing 107 has a pair of accommodating chambers 108 opening on an external wall and a flange portion 123 projecting outwardly.

The flange portion 123 is formed flatly along the printed circuit board 120. A screw hole 124 for a bolt 121 is formed in the flange portion 123. The screw hole 124 is bored through the flange portion 123. And, in the housing 107 the optical plug fits.

The optical receiving module and the optical transmitting module 104 are accommodated in the respective accommodating chamber 108. The pair of sleeves 101 are made of light-readable material in a cylindrical shape and are inserted into respective non-shown transferring tubes of the housing 107. The sleeve 101 consists of a core and a clad having different indexes of refraction and arranged coaxially.

The sleeve 101 is arranged between the optical fiber and a light-receiving surface of the optical receiving module 104 and also between another optical fiber and a light-emitting surface of the optical transmitting module 104 and connects them optically.

And, a cap 110 is installed after accommodating the optical receiving module and the optical transmitting module in the accommodating chambers 108. The cap 110 is formed of elastic synthetic resin in a rectangular tabular shape.

The cap 110 is attached to the housing 107 by means of engaging projections 110a and engaging recesses 110b engagable each other. The engaging projection 110a projects outwardly from the periphery of the cap 110. The engaging recess 110b is formed on the internal surface of the housing 107.

The optical plug has a pair of optical fibers, a pair of ferrules, and a plug housing of synthetic resin. The pair of optical fibers are arranged in parallel. The ferrule covers the optical fiber with its end being exposed. The plug housing accommodates the ferrules and couples with the housing.

The receptacle 103 coupled with the optical plug receives the signal light transmitted from one of the optical fibers on the light-receiving surface of the optical receiving module 104 through one of the sleeves 101. And, the optical receiving module converts the signal light into the electrical signal. And, the optical transmitting module 104 converts the electrical signal into the signal light and transmits it toward the other optical fiber through the other sleeve 101.

And, the above receptacle 103 is fixed to the printed circuit board 120 by means of the bolt 121 and the screw hole 124 through the above hole 122. When the bolt 121 is screwed to the screw hole 124, an insulation film formed over the screw hole 124 is removed. And, through the bolt 121 the base material of the housing 107 is electrically connected to the conductive pattern of the printed circuit board 120, whereby an earth circuit reaching the printed circuit board 120 from the base material of the above housing 107 is formed.

With respect to the above prior art receptacle 103, however, when the receptacle 103 is mounted on the printed circuit board 120, i.e. a substrate member, the bolt 121 has to be screwed in the screw hole 124 from the back side of the printed circuit board 120, thereby increasing the assembling cost.

SUMMARY OF THE INVENTION

In view of the foregoing, an object of the present invention is to provide an optical connector capable of reducing its mounting cost on the substrate member.

In order to achieve the above object, an optical connector comprises: a housing, having a base material of conductive resin and an insulation film covering a surface of the base material, to accommodate an optical receiving module and an optical transmitting module; and a fixing member, attached to the housing, to fix the housing to a substrate member by engaging with an engagement receiving portion of the substrate member, wherein the housing has a press-fit receiving portion to which the fixing member is pressedly inserted, and upon inserting the fixing member in the press-fit receiving portion the insulation film over the press-fit receiving portion is removed thereby to put the fixing member into contact with the base material.

In the above optical connector, when the fixing member to engage the engagement receiving portion of the substrate member is pressed in a press-fit receiving portion of the housing, the fixing member is put into contact with in the base material, of the housing, of conductive resin. Therefore, the housing can be fixed to the substrate member by pressing the fixing member in the press-fit receiving portion and engaging the fixing member with the engagement receiving portion.

According to the above-described structure of the present invention, since the housing can be fixed to the substrate member by inserting the fixing member in the press-fit receiving portion of the housing and by engaging the fixing member with the engagement receiving portion, labor required for mounting the receptacle onto the substrate member can be reduced.

The above and other objects and features of the present invention will become more apparent from the following description taken in conjunction with the accompanying drawings.

BRIEF DESCRIPTION OF THE DRAWINGS

FIG. 7 is a partly sectional view showing the earthing terminal and an earthing terminal press-fit portion of the receptacle of the same embodiment;

FIG. 8 is a partly sectional view showing a state that the earthing terminal is being inserted into the earthing terminal press-fit portion of the receptacle of the same embodiment;

FIG. 9 is a partly sectional view showing a state that the earthing terminal has been inserted into the earthing terminal press-fit portion of the receptacle of the same embodiment;

FIG. 15 is a partly sectional side view showing a state that the receptacle shown in FIG. 13 is attached to the printed circuit board.

DESCRIPTION OF THE PREFERRED EMBODIMENT(S)

Figure 1:
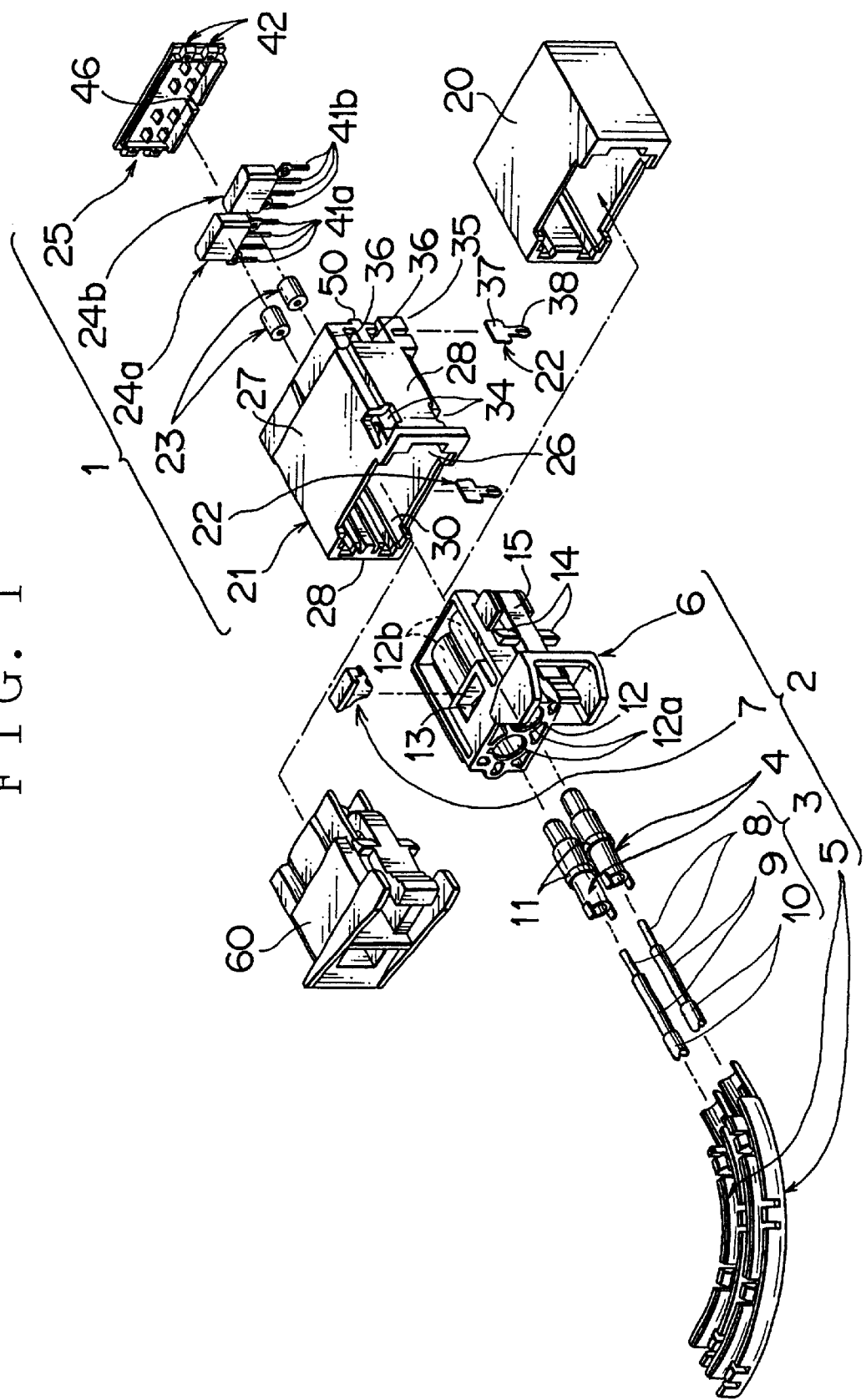
FIG. 1 is an exploded perspective view showing a first embodiment of a receptacle as an optical connector and an optical plug as a mating optical connector in accordance with the present invention.

A first embodiment of the optical connector will now be described in further detail with reference to the accompanying drawings. A receptacle (a equipment side connector) 1 as an optical connector in accordance with the first embodiment of the present invention is, as shown in FIG. 1, coupled with an optical plug 2 as a mating optical connector. The optical plug 2, as shown in FIG. 1, has a pair of optical fiber cables 3, a pair of ferrules 4, a pair of directing members 5, a plug housing 6, and a ferrule engaging member 7.

The optical fiber cable 3 has an optical fiber 8 of light-readable material, a first sheath portion 9, and a second sheath portion 10. The optical fiber 8 is of a well-known multimode plastic optical fiber, which consists of a core and a clad that have different indexes of refraction and are arranged coaxially.

The first and second sheath portions 9,10 are formed of insulative synthetic resin. The first sheath portion 9 covers and protects the optical fiber 8. The second sheath portion 10 covers and protects the optical fiber 8 and the first sheath portion 9.

The optical fiber cable 3 is steppingly formed with the optical fiber 8, and the and first second sheath portions 9,10 at the end portion thereof.

The ferrule 4 is formed of synthetic resin. The ferrule 4 is cylindrically formed with steppingly changing outside diameters. Each ferrule 4 has a flange portion 11 projecting circularly. Each ferrule 4 fixingly covers the optical fiber cable 3 in a state that the end face of the optical fiber 8 is exposed.

Each directing member 5 of synthetic resin curves by 90 degrees. The directing member 5 has a U-shaped cross-section. Each directing member 5 is fixed to the proximal end portion of the ferrule 4.

Each directing member 5 accommodates the optical fiber cable 3 fixed to the ferrule 4 and protects the optical fiber cable 3. The pair of directing members 5 curve such that the optical fiber cables 3 accommodated are arranged in parallel.

The plug housing 6 is formed of synthetic resin in a box-shape and has therein a pair of accommodating chambers 12 in parallel. Each accommodating chamber 12 has a first opening portion 12a which opens onto one end surface of the plug housing 6 and a second opening portion 12b which opens onto the other end surface which stands opposing the one end surface; that is, each accommodating chamber 12 is bored through the plug housing 6.

The ferrule 4 fixed to the optical fiber cable 3 is inserted into the accommodating chamber 12 through the above first opening portion 12a from the distal end portion. The accommodating chamber 12 accommodates the ferrule 4 fixed to the optical fiber cable 3.

And, an insertion hole 13 is bored through one external wall of the plug housing 6 as shown on FIG. 1. Further, a resilient locking arm 15 having an engaging projection 14 for the receptacle 1 is provided on another external wall of the plug housing 6.

A part of the ferrule engaging member 7 is inserted into the accommodating chamber 12 through the insertion hole 13. When the part of the ferrule engaging member 7 is inserted into the accommodating chamber 12, the ferrule engaging member 7 is engaged with, and fixed to, the plug housing 6.

Like the above, the flange portion 11 of the ferrule 4 is engaged for preventing the ferrule 4 from coming out of the accommodating chamber 12. The ferrule engaging member 7 allows the ferrule 4, the optical fiber cable 3 and the directing member 5 to rotate around the axes.

The above optical plug 2 is assembled as follows. The ferrule 4 is fixed to the distal end portion of the optical fiber cable 3. The optical fiber cable 3 is inserted into the directing member 5, and the directing member 5 and the ferrule 4 are fixed to each other.

The ferrule 4 fixed to the optical fiber cable 3 is inserted into in the accommodating chamber 12 from its distal end portion through the first opening portion 12a. The ferrule engaging member 7 is inserted in the insertion hole 13 so as to engage the ferrule 4 with the plug housing 6. Like the above, the optical plug 2 is assembled.

And, the optical plug 2 is covered with a dustproofing casing 20 made of synthetic resin as show in FIG. 1 in transportation before the coupling with the receptacle 1.

Figure 2:
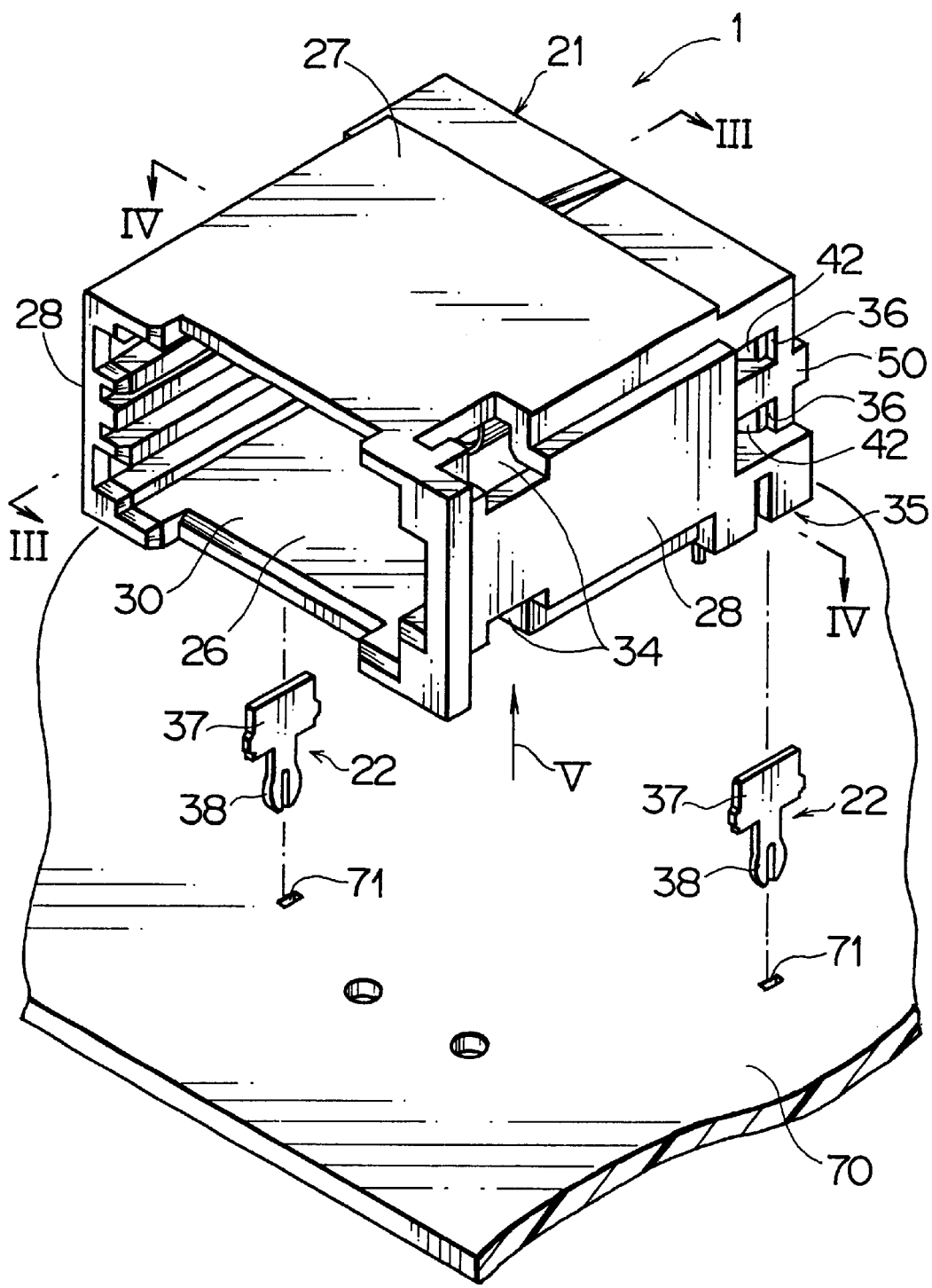
FIG. 2 is a perspective view showing the receptacle of the same embodiment.

The receptacle 1 is attached to a printed circuit board 70 of various electronic equipment as the accessories as shown in FIG. 2. Here, this printed circuit board 70 has a slit 71 with which a later-described earthing terminal 22 can engage.

The slit 71 is bored through the printed circuit board 70 in a longitudinal direction of the receptacle 1. And, the slit 71 is arranged at a position corresponding to a later-described earthing terminal press-fit portion 35 of the receptacle 1. Here, the printed circuit board 70 corresponds to the substrate member in the claim, and the slit 71 corresponds to the engagement receiving portion in the claim.

The receptacle 1, as shown in FIGS. 1, 2, 3, and 4, has a housing 21 of synthetic resin, a pair of earthing terminals 22 as the fixing members, a pair of sleeves 23, an optical receiving device 24a as the optical receiving module, an optical transmitting device 24b as the optical transmitting module, and a cap 25.

The housing 21, as shown in FIG. 7, has a base material 21a of insulative synthetic resin and an insulation film 21b formed on the outside surface of the base material 21a. The base material 21a forms an external form of the housing 21. The insulation film 21b is formed as an insulative thin film, covering the outside surface, i.e. the whole surface, of the base material 21a.

The housing 21, as shown in FIG. 2 to FIG. 5, has a bottom wall 26 arranged along the above printed circuit board 70, a ceiling wall 27 arranged opposite to the bottom wall 26 with a interval, and a pair of sidewalls 28 opposing to each other and connected to both the ceiling wall 27 and the bottom wall 26.

Figure 3:
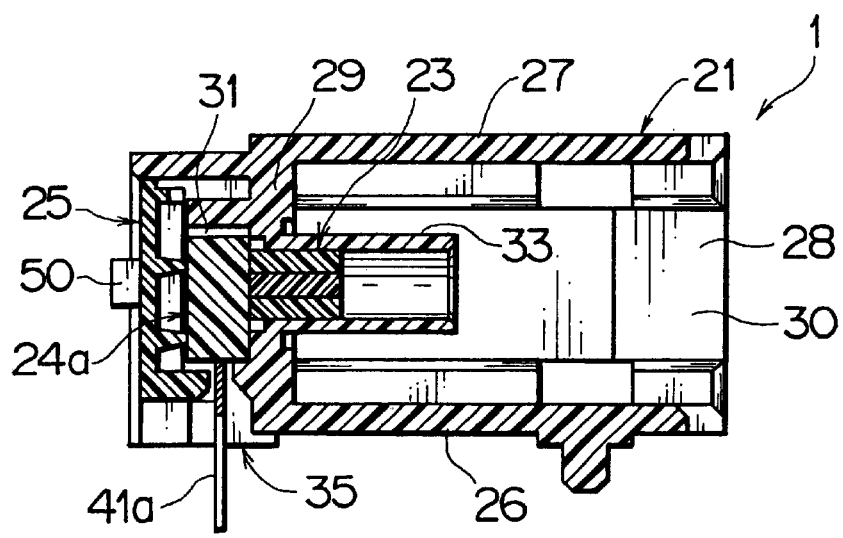
FIG. 3 is a sectional view taken along a line III—III in FIG. 2.
Figure 4:
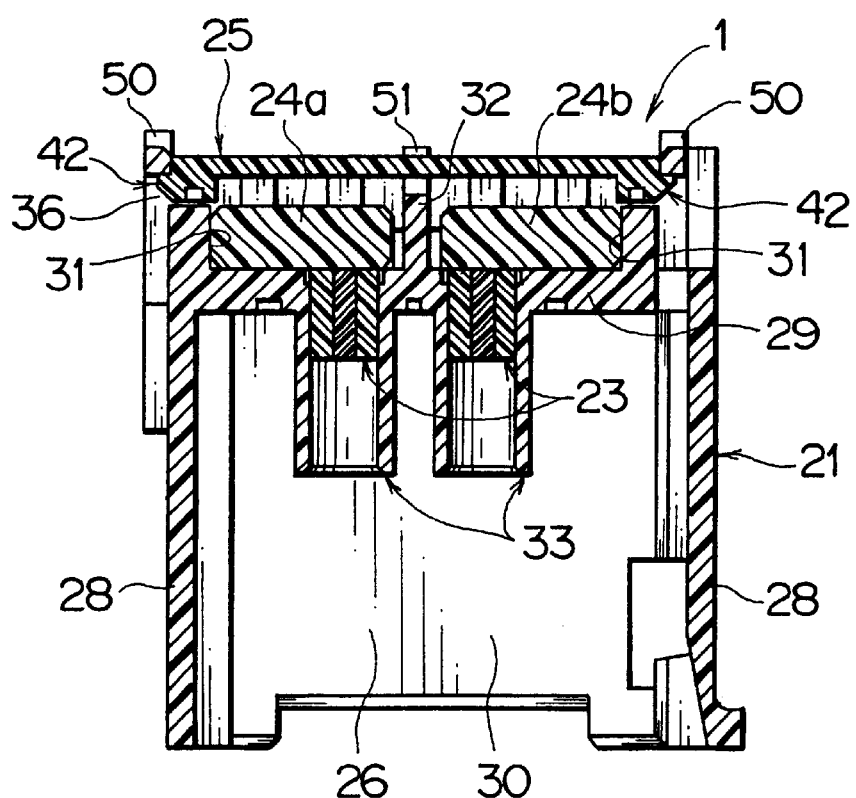
FIG. 4 is a sectional view taken along a line IV—IV in FIG. 2.

And, the housing 21 has a a central wall 29 provided inside the above walls 26,27,28 (FIG. 3 and FIG. 4), a coupling chamber 30 (FIG. 3 to FIG. 4), a pair of accommodating chambers 31 (FIG. 3 and FIG. 4), a partition wall 32 (FIG. 4), and a pair of transferring tubes 33 (FIG. 3 and FIG. 4).

The central wall 29 is arranged in a space surrounded by the above walls 26,27,28, continuing therefrom orthogonally.

The coupling chamber 30 is a space surrounded by the walls 26, 27, 28, communicates with the outside, and is formed at one end by the central wall 29. In the coupling chamber 30, the optical plug 2 is inserted from the second opening portion 12b. opening portion 12b.

The pair of accommodating chambers 31 are surrounded by the walls 26,27,28 and are provided on the other side of the central wall 29.

The above partition wall 32, as shown in FIG. 4, extends from the other surface of the central wall 29 toward the side of the cap 25. The partition wall 32 is arranged in the middle of the pair of sidewalls 28. The partition wall 32 sections the pair of accommodating chambers 31.

Each transferring tube 33 is formed cylindrically with almost the same inside diameter as an outside diameter of the distal end portion of the ferrule 4. The transferring tube 33 continues from the central wall 29 toward the opening portion of the coupling chamber 30 as shown in FIG. 3 and FIG. 4. The transferring tubes 33 are arranged along the walls 26,27,28. And, each transferring tube 33 communicates the respective accommodating chambers 31 with the coupling chamber 30.

The housing 21, as shown in FIG. 1, FIG. 2 and FIG. 4, has a pair of fitting holes 34 for the respective engaging projections 14 of the locking arms 15 of the optical plug 2 inserted into the coupling chamber 30, a pair of earthing terminal press-fit portions 35 as press-fit receiving portions, an engaging hole 36, a guide projection 50, and an extending portion 51.

One fitting hole 34 is bored through the housing 21 over the ceiling wall 27 and one sidewall 28, and the other fitting hole 34 is bored through the housing 21 over the bottom wall 26 and the other sidewall 28. Each fitting hole 34 is engaged with the engaging projection 14 of the locking arm 15 of the optical plug 2.

The earthing terminal press-fit portion 35 is provided at the lower edge portion of each sidewall 28. The earthing terminal press-fit portions 35 each project outward from the sidewall 28. One earthing terminal press-fit portion 35 shown in FIG. 2 is provided near the accommodating chamber 31, and the other earthing terminal press-fit portion 35 is provided at the middle portion between the coupling chamber 30 and the accommodating chamber 31.

Figure 5:
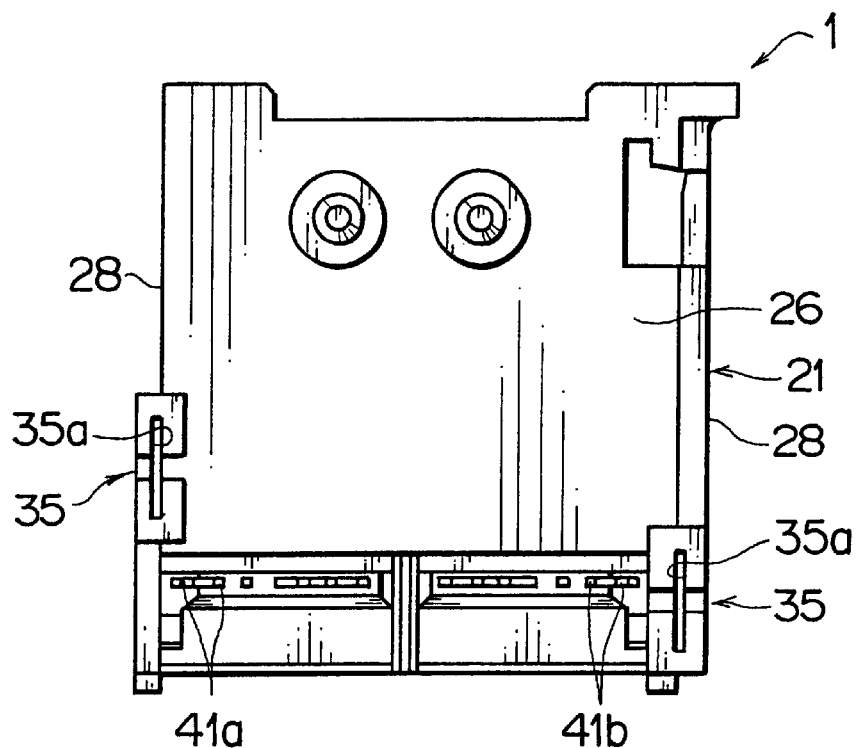
FIG. 5 is a bottom view taken from an arrow V direction in FIG. 2.

Each earthing terminal press-fit portion 35 has a press-fit hole 35a opened in the bottom wall 26 as shown in FIG. 5. The press-fit hole 35a is formed rectangularly in a longitudinal direction of the housing 21.

A pair of engaging holes 36 are provided on each sidewall 28 at the end portion thereof near the accommodating chamber 31. The pair of engaging holes 36 are vertically arranged between the ceiling wall 27 and the bottom wall 26. The engaging hole 36 is bored through the sidewall 28 and communicates the inside thereof with the outside. And, the engaging hole 36 is formed rectangularly.

The guide projections 50 are provided on the respective end portions of the sidewall 28 on the side of the accommodating chamber 31. That is, the guide projections 50 project in a longitudinal direction of the housing 21 from the respective sidewall 28. Each guide projection 50 is arranged between the pair of engaging holes 36.

The extending portion 51 is integrally formed with the partition wall 32 as shown in FIG. 4, while extending from the end portion of the partition wall 32 at the side of the bottom wall 26 in an outside direction of the housing 21. The extending portion 51 is formed tabularly.

Figure 6:
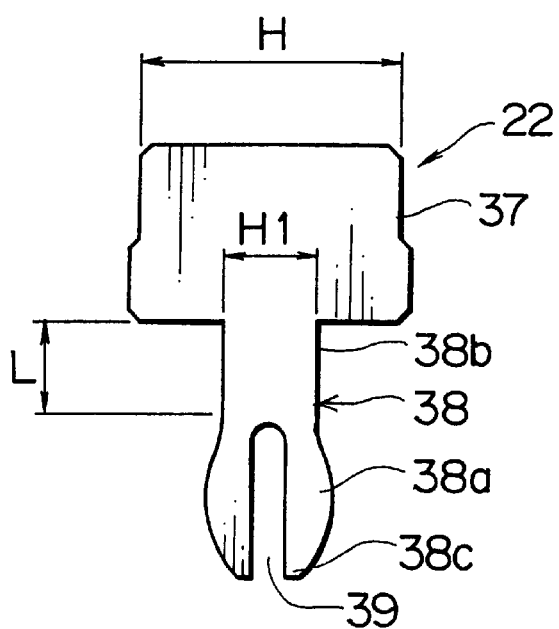
FIG. 6 is a front view showing an earthing terminal of the receptacle of the same embodiment.

The pair of earthing terminals 22 are made of conductive metal. Each earthing terminal 22 integrally has a housing press-fit portion 37 and a substrate inserting portion 38 as shown in FIG. 1 and FIG. 6. The housing press-fit portion 37 is formed rectangularly.

The housing press-fit portion 37 is pressedly inserted from the bottom wall 26 side into the press-fit hole 35a of the earthing terminal press-fit portion 35. A width H (FIG. 6) of the housing press-fit portion 37 is a little larger than an interval D (FIG. 7) of the press-fit hole 35a of the earthing terminal press-fit portion 35.

The longitudinal central portion 38a of the substrate inserting portion 38 is wider than the other portions; that is, a proximal end portion 38b and a distal end portion 38c.

A length L (FIG. 6) of the proximal end portion 38b of the substrate inserting portion 38 is almost the same as a thickness T (FIG. 10) of the printed circuit board 70. A length H1 (FIG. 6) of the proximal end portion 38b of the substrate inserting portion 38 is almost the same as a width H2 (FIG. 10) of the printed circuit board 70.

And, a slit 39 is formed on the substrate inserting portion 38 from the distal end portion 38c toward the central portion 38a.

The distal end portion 38c can be elastically inwardly bendable. When the housing press-fit portion 37 is pressedly inserted in the earthing terminal press-fit portion 35, the substrate inserting portion 38 projects from the bottom wall 26 of the housing 21.

The optical transmitting device 24b and the optical receiving device 24a are accommodated in the respective accommodating chambers 31. The optical receiving device 24a converts the signal light into the electrical signal and has a light-receiving surface and lead terminals 41a.

The light-receiving surface faces the end face of the optical fiber cable 3 of the optical plug 2 when the optical receiving device 24a is accommodated in the accommodating chamber 31. The lead terminals 41a electrically connect the optical receiving device 24a with the conductor pattern of the printed circuit board 70 and project over the bottom wall 26 of the housing 21.

The optical transmitting device 24b converts the electrical signal into the signal light and has a light-emitting surface and lead terminals 41b. The light-emitting surface faces the end face of the optical fiber cable 3 of the optical plug 2 when the optical transmitting device 24b is accommodated in the accommodating chamber 31. The lead terminals 41b electrically connect the optical receiving device 24b with the conductor pattern of the printed circuit board 70 and project over the bottom wall 26 of the housing 21.

The sleeve 23 has almost the same outside diameter as the inner diameter of the transferring tube 33. which transmits the signal light. The sleeves 23 are inserted into the respective transferring tubes 33 and optically connect the optical receiving/transmitting devices 24a,24b and the respective optical fiber cables 3 of the optical plug 2.

The cap 25 is formed of elastic synthetic resin tabularly. The cap 25 is attached to the housing 21 such that it covers the optical receiving/transmitting devices 24a,24b.

The cap 25 has engaging claws 42 engageable with the engaging holes 36 and a groove 46 as shown in FIG. 1. A pair of claws 42 are provided on each side of the cap 25. The groove 46 is provided in the middle of the lower portion of the cap 25. The extending portion 51 is put into the groove 46.

The receptacle 1 is assembled as follows.

Some part of the sleeve 23 is inserted into the transferring tube 33 of the housing 21. The optical receiving/transmitting devices 24a,24b are put at respective appropriate positions with respect to the respective sleeves 23. The caps 25 are set close to the opening portion of the accommodating chambers 31.

The guide projection 50 is positioned between the pair of engaging claws 42, and the extending portion 51 is positioned in the groove 46. The optical receiving/transmitting devices 24a,24b are pressed into the respective accommodating chambers 31 by the cap 25. Then, the engaging claws 42 engage the engaging holes 36, and the cap 25 is attached to the housing 21.

Like this, the receptacle 1 is assembled. In this state, the receptacle 1 can be coupled with the optical plug 2. And, the receptacle 1 with the above structure is covered with a dustproof casing 60 shown in FIG. 1 before the coupling during the transportation.

Further, when attached to the printed circuit board 70, first as shown in FIG. 7, the housing press-fit portion 37 of the earthing terminal 22 is faced to the press-fit hole 35a. The housing press-fit portion 37 is pressed in the press-fit hole 35a as shown in FIG. 8.

At this time, because the above width H is larger than the above interval D, the insulation film 21b formed on the inner surface of the press-fit hole 35a is removed by the housing press-fit portion 37.

As shown in FIG. 9, the housing press-fit portion 37 of the earthing terminal 22 is pressedly inserted into the press-fit hole 35a of the earthing terminal press-fit portion 35 until making a state that the bottom face of the earthing terminal press-fit portion 35 is flush with a bottom edge of the housing press-fit portion 37. The housing portion 37 of the earthing terminal 22 is put into contact with the base material 21a of the housing 21, thereby making an electrical connection herebetween.

Figure 10:
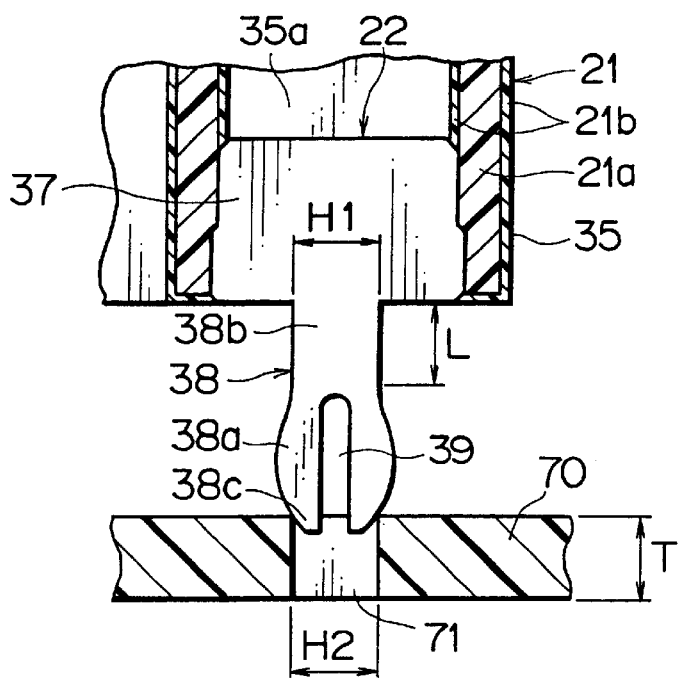
FIG. 10 is a partly sectional view showing a state that the earthing terminal of the receptacle faces a slit of a printed circuit board.
Figure 11:
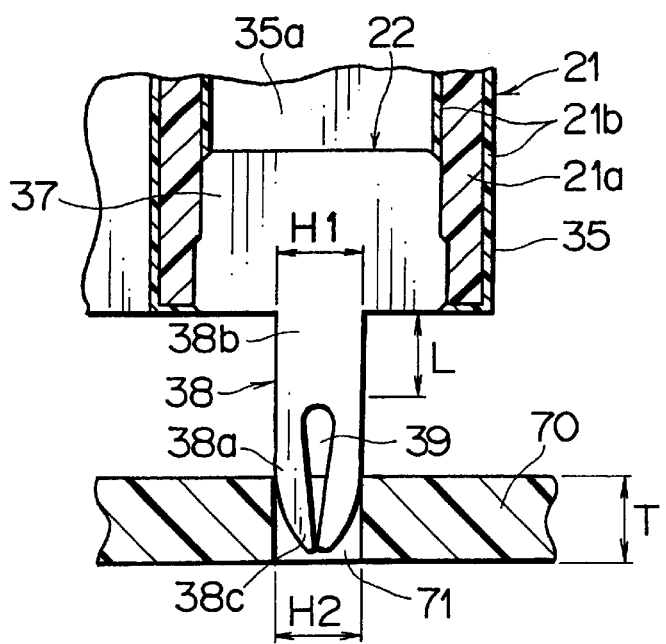
FIG. 11 is a partly sectional view showing a state that the earthing terminal of the receptacle is being inserted into the slit of a printed circuit board.

The substrate inserting portion 38 of the earthing terminal 22 is faced to the slit 71, and the lead terminals 41a,41b are faced to non-shown mounting holes of the printed circuit board 70. As shown in FIG. 10, the distal end portion 38c of the substrate inserting portion 38 contacts an edge of the slit 71 when the bottom wall 26 is gradually brought close to the printed circuit board 70. When the bottom wall 26 is brought closer to the printed circuit board 70 as shown in FIG. 11, the distal end portion 38c and the central portion 38a are elastically-deformed owing to the slit 39, and the substrate inserting portion 38 is gradually inserted in the slit 71.

Figure 12:
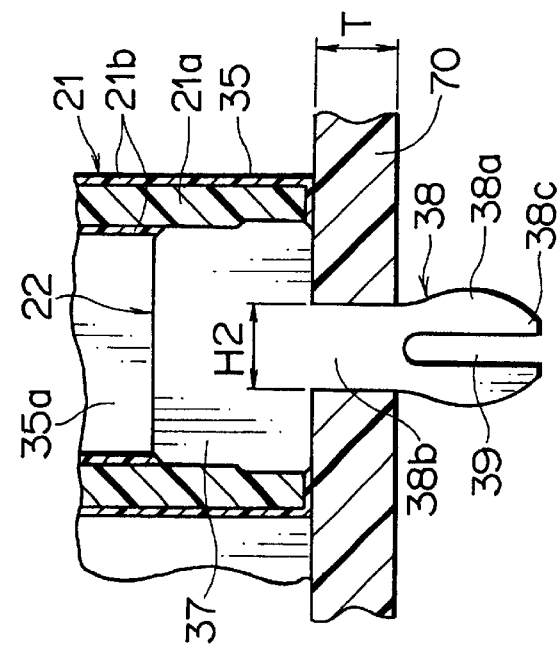
FIG. 12 is a partly sectional view showing a state that the earthing terminal of the receptacle has engaged the slit of a printed circuit board.
Figure 16:
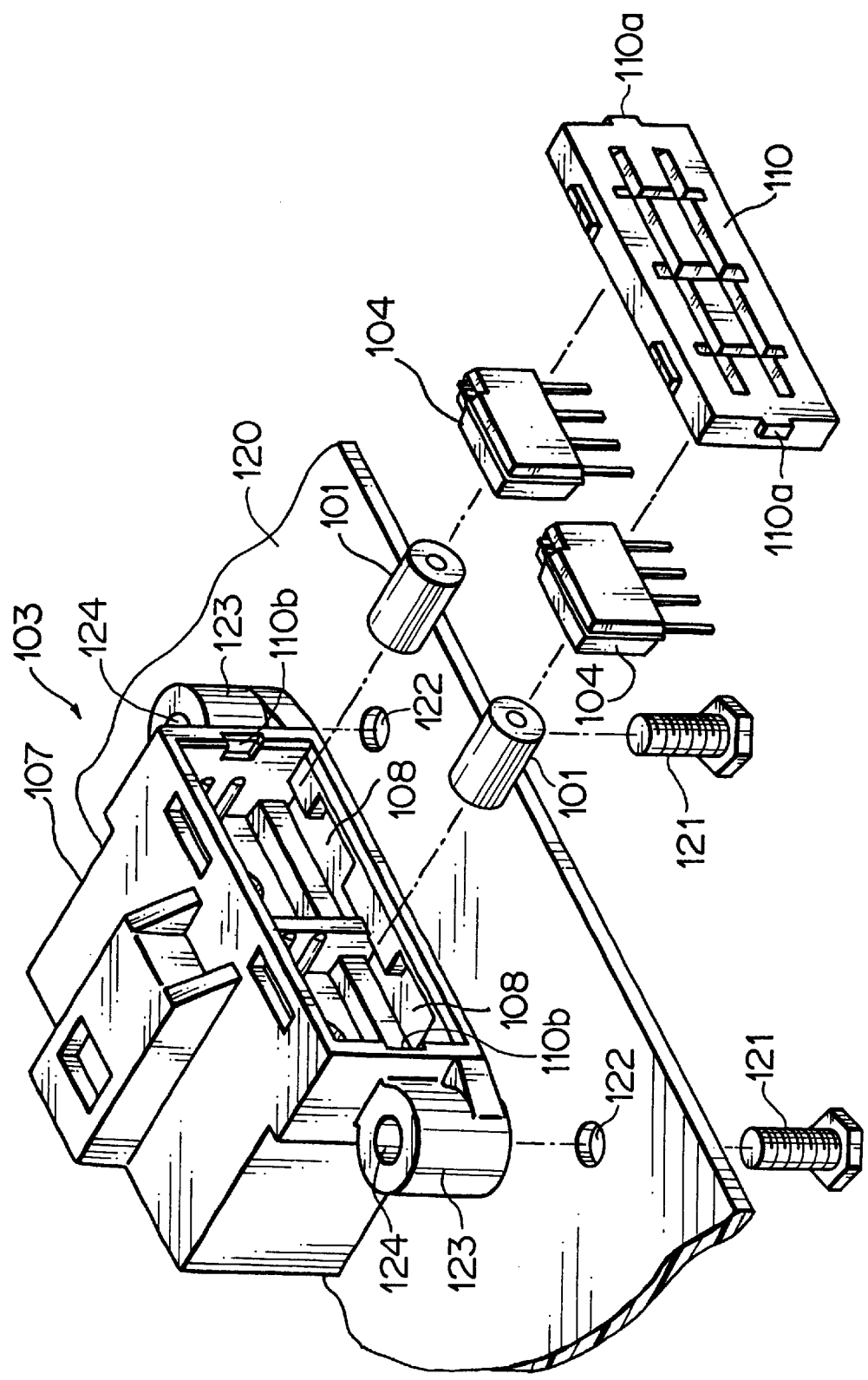
FIG. 16 is an exploded perspective view showing a prior art receptacle as an optical connector.

When the central portion 38a and the distal end portion 38c are exposed from the back surface of the printed circuit board 70 through the slit 71, the earthing terminal 22 engages the printed circuit board 70 as shown in FIG. 12 and is fixed thereto because the thickness T of the printed circuit board 70 and the length L of the proximal end portion 38b are almost equal and the width H2 of the slit 71 and the width H1 of the proximal end portion 38b are almost equal, whereby the earthing terminal 22 is put into contact with the conductor pattern of the printed circuit board 70 and is electrically connected. Here, the distal end portions of the lead terminals 41a,41b are also electrically connected to the conductor pattern of the printed circuit board 70.

And, an earth circuit reaching the printed circuit board 70 from the base material 21a of the housing 21 is formed. The lead terminals 41a,41b are fixed to the conductor pattern of the printed circuit board 70 by soldering or the like. Like this, the receptacle 1 is fixed to the printed circuit board 70.

According to the present embodiment, when the earthing terminal 22 is pressed in the earthing terminal press-fit portion 35 of the housing 21, the earthing terminal 22 is put into contact with the base material 21a, of the housing 21, having a conductivity. That is, the receptacle 1 can be fixed to the printed, circuit board 70 by inserting the earthing terminal 22 in the earthing terminal press-fit portion 35 of the housing 21 and by engaging the earthing terminal 22 with the walls forming the slit 71 of the printed circuit board 70. Therefore, labor for mounting the receptacle 1 onto the printed circuit board 70 can be reduced.

Figure 14:
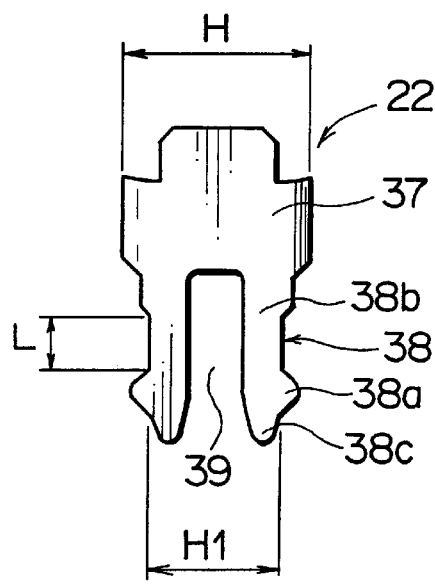
FIG. 14 is a front view showing the earthing terminal of the receptacle shown in FIG. 13.
Figure 13:
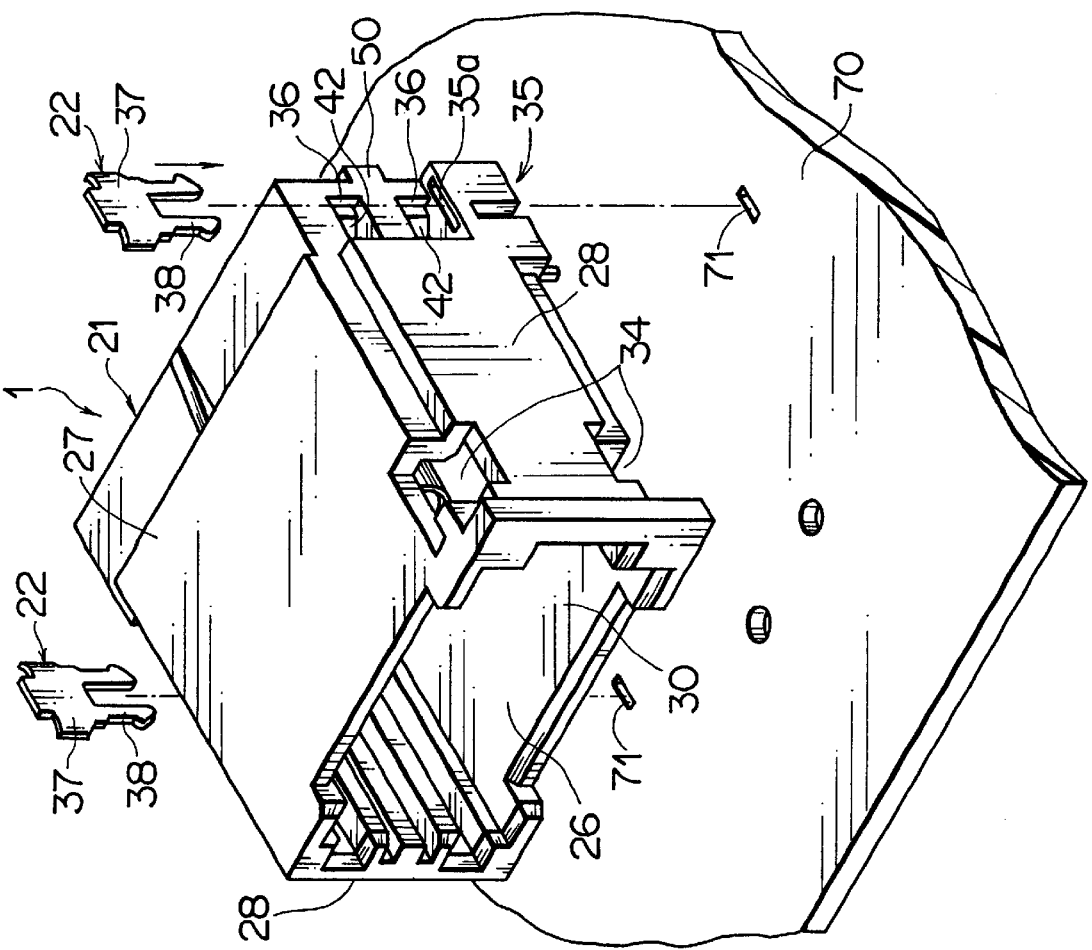
FIG. 13 is a perspective view showing a second embodiment of a receptacle in accordance with the present invention.

Next, the receptacle 1 in accordance with a second embodiment of the present invention is described by referring to FIGS. 13–15.

Here, the same reference characters are designated to the same elements or members of the first embodiment, and description thereof is omitted.

As shown in FIG. 13, the press-fit holes 35a of the present embodiment extend through the earthing terminal press-fit portion 35 vertically.

And, the earthing terminals 22 of the present invention are inserted into the press-fit hole 35a from the ceiling wall 27 side. Further, each earthing terminal 22 of the present embodiment also has the housing press-fit portion 37 and the substrate inserting portion 38 has shown in FIG. 14.

When the earthing terminal 22 is pressedly inserted into the press-fit hole 35a as shown in FIG. 15, the earthing terminal 22 removes the insulation film 21b on the inner surface of the press-fit hole 35a and is put into contact with the base material 21a.

According to the present embodiment, similarly to the first embodiment, when the earthing terminal 22 is pressed in the earthing terminal press-fit portion 35 of the housing 21, the earthing terminal 22 is put into contact with the base material 21a, of the housing 21, having a conductivity. That is, the receptacle 1 can be fixed to the printed circuit board 70 by inserting the earthing terminal 22 In the earthing terminal press-fit portion 35 of the housing 21 and by engaging the earthing terminal 22 with the slit 71 of the printed circuit board 70. Therefore, labor for mounting the receptacle 1 onto the printed circuit board 70 can be reduced.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical connector, comprising:

a housing to accommodate an optical receiving module and an optical transmitting module, said housing having a base material of conductive resin and an insulation film covering a surface of the base material; and a fixing member, attached to the housing, to fix the housing to a substrate member by engaging with an engagement receiving portion of the substrate member, wherein the housing has an opening formed by walls, covered by the insulation film, to define a press-fit receiving portion into which the fixing member is pressedly inserted, the fixing member including a substrate insertion portion at one end thereof and a housing press-fit portion at the other end thereof, the housing press-fit portion having a lateral dimension at least as great as the interval between opposite walls of said opening in the housing whereby the insulation film over the press-fit receiving portion is removed to place the fixing member into contact with the base material of the housing when the fixing member is pressedly inserted into the press-fit receiving portion.

* * * * *